(12) United States Patent
Vanpoulle et al.

(10) Patent No.: US 6,423,809 B1
(45) Date of Patent: Jul. 23, 2002

(54) POLYURETHANE ACRYLATE OR VINYL TYPE POLYMERIC MATERIAL FOR COATING OPTICAL FIBERS BASED ON A FLUORINATED DIOL

(75) Inventors: Sophie Vanpoulle, Gif sur Yvette; Gérard Orcel, Maison Laffitte, both of (FR); Bob J. Overton, Lenoir, NC (US); Marie-José Lina, Lyons; Eric Lacroix, Amberieux D'Azergues, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/701,654

(22) PCT Filed: Mar. 27, 2000

(86) PCT No.: PCT/FR00/00760

§ 371 (c)(1),
(2), (4) Date: Feb. 12, 2001

(87) PCT Pub. No.: WO00/59976

PCT Pub. Date: Oct. 12, 2000

(30) Foreign Application Priority Data

Apr. 1, 1999 (FR) ............................................ 99 04073

(51) Int. Cl.$^7$ ................................................ C08G 18/67
(52) U.S. Cl. ............................. 528/49; 528/70; 528/75; 522/96; 522/97; 522/98; 526/248; 428/364; 427/508; 427/512
(58) Field of Search .............................. 528/75, 49, 70; 522/97, 98, 96; 526/248; 428/364; 427/512, 508

(56) References Cited

U.S. PATENT DOCUMENTS 5,567,794 A * 10/1996 Barraud et al.

FOREIGN PATENT DOCUMENTS

| DE | 2336913 | * | 2/1974 |
| EP | 0 565 425 A1 | | 10/1993 |
| FR | 2 453 871 | | 11/1980 |
| WO | WO 96/23828 | | 8/1996 |

OTHER PUBLICATIONS

Database WPI "Polyurethane methopolyacrylate mixture coating optical fibre" XP002122793 corresponding to JP 01 242613 A (Nippon Kayaku) date Sep. 27, 1989.
Chemical Abstracts, vol. 114, No. 18, May 6, 1991, Abstract No. 16938n p. 347, XP000193780 corresponding to JP 02 255711A (Nippon Kayaku) dated Mar. 30, 1989.

* cited by examiner

Primary Examiner—Rachel Gorr
(74) Attorney, Agent, or Firm—Sughrue Mion, PLLC

(57) ABSTRACT

The invention provides a polyurethane type polymeric material for coating optical fibers, based on a fluorinated diol with formula I:

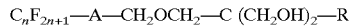

$$C_nF_{2n+1}-A-CH_2OCH_2-C(CH_2OH)_2-R$$

where n is 2 to 20, and A signifies —CH=CH or —CH$_2$CH$_2$—, and R is an alkyl group containing 1 to 4 carbon atoms. The invention also provides a fiber coated with this polymer which has been light-cured, and a fiber drawing method comprising a step of coating the fiber with a material of the invention.

14 Claims, No Drawings

POLYURETHANE ACRYLATE OR VINYL TYPE POLYMERIC MATERIAL FOR COATING OPTICAL FIBERS BASED ON A FLUORINATED DIOL

BACKGROUND OF THE INVENTION

The invention relates to a polyurethane acrylate or vinyl type polymeric material for coating optical fibers or for an optical fiber ribbon based on a fluorinated diol.

Optical fibers are known that comprise a double polymer coating constituted by a plasticized primary coating in contact with the glass fiber and surmounted by a secondary coating. That double coating protects the fiber from mechanical or chemical attack that may cause attenuation faults for optical transmission.

The adhesion of each coating to the intended support must be good and its physical properties must be compatible with the conditions under which the fibers are drawn, in particular with the draw rate and with the final use of the fiber. The primary coating must absorb microbending and any stresses on the glass. The secondary coating endows the fiber with its mechanical properties.

Currently, primary and secondary coatings are polyurethane acrylate type coatings that are light-cured by UV radiation.

European patent application EP-A-0 565 425 describes a fluorinated polyurethane acrylate type polymeric material for coating optical fibers based on at least one diol, a diisocyanate, and an acrylate, characterized in that at least one of said compounds contains fluorine and at least one of said compounds contains sulfur.

That material has good mechanical characteristics, in particular improved static fatigue strength. However, it employs a sulfur-containing diol, for example, which involves high production costs because of the intermediate thiol preparation step that leads to the production of by-products that must be eliminated. The problem is identical to that of the other sulfur-containing compounds used to prepare the material described in application EP-A-0 565 425.

Thus, a material is sought that possesses the same mechanical properties but which does not require the use of sulfur-containing products, in particular sulfur-containing diols.

SUMMARY OF THE INVENTION

The invention provides a polyurethane type polymeric material for coating optical fibers, based on at least one diol, a diisocyanate, and an ethylenically unsaturated compound, characterized in that the diol is a fluorinated diol with formula I:

where n is 2 to 20, and A signifies —CH=CH or —CH$_2$CH$_2$—, and R is an alkyl group containing 1 to 4 carbon atoms.

In one embodiment, the diol is unsaturated and corresponds to formula:

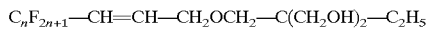

In another embodiment, the diol is saturated and corresponds to formula:

In an embodiment, in formula I, R is C$_2$H$_5$.

In an embodiment, in formula (I), n is a whole number in the range 6 to 14 inclusive.

In an embodiment, in formula (I), C$_n$F$_{2n+1}$ results from a mixture and n is in the range 6 to 14 inclusive.

In an embodiment, in formula (I), n is in the range 6 to 8 inclusive.

In an embodiment of the material, the ethylenically unsaturated compound is an acrylate.

The invention also provides a method of preparing the material of the invention, comprising:

(i) a step of reacting the fluorinated diol with the diisocyanate to produce a fluorinated diisocyanate prepolymer;

(ii) a step of reacting the fluorinated diisocyanate prepolymer with a hydroxyl-containing ethylenically unsaturated compound.

The invention also provides a fiber coated with at least one layer of a material of the invention which is light-cured; in particular, this layer is the secondary layer.

In an embodiment, the material is light-cured in the presence of a diacrylate as a reactive diluent.

The invention also provides a method of drawing a fiber, comprising coating the fiber with a material of the invention, optionally mixed with a diacrylate as a reactive diluent, and a light-curing step.

In particular, the polymeric material of the invention is free of sulfur.

DETAILED DESCRIPTION OF THE INVENTION

The diisocyanates and the ethylenically unsaturated compounds such as vinyl ethers and acrylates are compounds which are conventionally used in the field under consideration. These compounds may optionally be fluorinated. The diisocyanate can be replaced by a polyisocyanate, but for convenience, the first term will be used as the generic term. Examples of such diisocyanates, acrylates, and vinyl ethers can be found amongst the compounds cited in EP-A-0 565 425, including fluorinated compounds (as long as they contain no sulfur), and amongst the compounds cited in French patent application FR-A-2 712 291.

To prepare fiber coatings, the material of the invention, which also has the particular feature of being curable, is light-cured, in general by UV, preferably in the presence of a reactive diluent which is generally a diacrylate, present in a conventional amount.

Conventionally, photoinitiators and/or catalysts are used for the (photo) chemical reactions, if necessary.

The fluorinated diols used in the invention are novel.

The fluorinated diols of the invention, where R is C$_2$H$_5$, are prepared by radical reaction of C$_n$F$_{2n+1}$I with allyloxy trimethylol propane (or trimethylol propane monoallylether) followed either by dehydroiodation optionally followed by hydrogenaton, or direct reduction or hydrogenolysis.

While the description has been made with reference to the diol where R is C$_2$H$_5$, clearly other compounds are prepared in the same manner starting from the appropriate monoallylether. This monoallyl ether is the trimethylol alkane monoallylether, with the alkane corresponding to the group R increased by one carbon atom.

Radical addition can be carried out using known operating procedures, either in the solid state, or in an organic solvent, or in water.

Such radical addition has been described in German patent application DE-A-2 336 913, the reaction conditions of which can be followed.

The organic solvent can be acetone, tetrahydrofuran, dioxane, dimethylformamide, N-methyl-2-pyrrolidone, dimethylsulfoxide, methyl ethyl ketone, methyl isobutyl ketone, ethanol, isopropanol, or isopropyl acetate. Preferably, a hydrosoluble solvent or a mixture of hydrosoluble solvents is used.

Radical addition is normally carried out in the presence of initiator(s) which are used in an amount of 0.1% to 1.5% with respect to the total weight of the monomers used, preferably 0.1% to 0.5%. The initiators can be peroxides such as benzoyl peroxide, lauroyl peroxide, succinyl peroxide, or tert-butyl perpivalate, or azo compounds such as 2,2'-azobisisobutyronitrile, 4,4'-azobis(4-cyanopentanoic acid), and 2,2'-azobis-[2-methylbutanenitrile].

The reaction temperature range is wide, i.e., from ambient temperature to the boiling point of the reaction mixture. Preferably, a temperature of 60° C. to 90° C. is used; (thus avoiding polymer formation). Similarly, the allyloxy trimethylol propane can be added dropwise to control the reaction and limit the temperature rise.

An iodine-containing addition product is thus obtained.

Dehydroiodation is carried out using a strong inorganic base such as sodium or potassium hydroxide, or a strong organic base such as DBU (1.8-diazabicyclo(5.4.0)undec-7-ene). The reaction is preferably carried out in an aqueous medium. By way of example, the quantity of strong base used is close to the stoichiometric amount. The temperature is generally limited to about 70°–75° C. (thus avoiding polymer formation).

This produces an unsaturated diol.

Saturated diols can be produced by different methods. They can be obtained from an addition product iodized by hydrogenolysis in the presence of an alkaline agent, or by reaction with sodium or zinc borohydride or lithium aluminum hydride or tributyl tin hydride. They can also be obtained from an unsaturated derivative by catalytic hydrogenation using known methods, either solvent-free or in solution in a conventional organic solvent such as ethanol or methanol, in the presence of a hydrogenation catalyst which, depending on the case, can be either Raney nickel or palladium on charcoal.

A saturated diol is thus obtained.

The perfluoroalkyl group $C_nF_{2n+1}$ can be linear or branched. The compound $C_nF_{2n+1}I$ is known per se and is prepared using conventional methods.

The following examples illustrate the invention without limiting its scope.

EXAMPLE 1 a) $C_nF_{2n+1}$—$CH_2CHI$—$CH_2OCH_2$—$C(CH_2OH)_2C_2H_5$:
125 grams weight of a mixture of perfluoroalkyl iodides with formula: $C_nF_{2n+1}I$ where n is 6, 8, 10, 12 and 14 in respective weight ratios of 63:25:8:2:2 (0.25 mole) in solution in 200 grams of acetone and 64.5 grams of trimethylol propane monoallylether (0.375 mole) were introduced into a one liter reactor heated by a double thermostatted envelope provided with an anchor blade agitator and a refluxing coolant. After inerting with nitrogen and heating to 62° C., radical addition was initiated with 0.4 gram of azobis-isobutyronitrile (AIBN) then 0.2 grams of AIBN was added every 2 hours. The $C_nF_{2n+1}I$ perfluoroalkyl iodide conversion was monitored by gas chromatography. The reaction was complete after 20 hours. After evaporating off the acetone under reduced pressure, the reaction mass was washed three times with 200 grams of demineralized water at 60° C. to eliminate the excess trimethylolpropane monoallylether. The addition product, in the form of a pale yellow viscous liquid, was separated by decanting then vacuum dried. It crystallized slowly at ambient temperature and had a melting point of about 41° C. The yield with respect to the $C_nF_{2n+1}I$ was practically quantitative.

b) $C_nF_{2n+1}$—$CH$=$CH$—$CH_2OCH_2$—$C(CH_2OH)_2$—$C_2H_5$:
Using the same reactor, the same reaction was carried out using identical quantities. After decanting, the aqueous washing phase was removed by aspiration then the addition product obtained was dehydroiodated without being isolated. To this end, it was maintained at 50° C. and an aqueous sodium hydroxide solution, i.e., 10.7 grams of sodium hydroxide (0.27 mole) in 50 grams of water, was added dropwise over one hour, so as not to exceed 65° C. The iodine-containing derivative conversion was monitored by gas chromatography: it was complete after 7 hours. After decanting, the aqueous phase was eliminated by aspiration then the organic phase was washed with demineralized water at 50° C. to neutrality. After separating the aqueous phase, the fluorinated diol obtained was dried by azeotropic distillation with cyclohexane. The solvent was then distilled under reduced pressure. A pale yellow viscous liquid was obtained in a yield of 95% with respect to the starting $C_nF_{2n+1}I$.

EXAMPLE 2

The procedure of Example 1 was followed, replacing the $C_nF_{2n+1}I$ mixture with $C_6F_{13}I$. The experimental conditions were the same and the iodine-containing addition compound was obtained quantitatively in the form of a pale yellow solid with a melting point of 46° C.

The structure was confirmed by proton NMR (300 MHz, $CDCl_3$). The chemical shifts δ were as follows:

4.42 ppm (—CH—I, quintuplet, 1H);

3.60–3.80 ppm (—$CH_2$—OH, complex group of peaks, 4H);

3.54 ppm (—$OCH_2$—C, singlet, 2H);

2.60–3.05 ppm (—$CH_2CF_2$—, complex group of peaks, 2H);

1.35 ppm ($CH_2CH_3$ quadruplet, 2H);

0.86 ppm ($CH_2CH_3$, triplet, 3H).

After dehydroiodation under the conditions described for Example 1b), a pale yellow viscous liquid (v≈1300 cps) was obtained with a density of 1.43. It was a mixture containing 1.3 mole % of starting diol, 73 mole % of trans isomer, 25 mole % of the cis isomer of the unsaturated fluorinated diol. Proton NMR analysis (400 MHz, $CDCl_3$) gave the following signals:

Trans isomer:

6.45 ppm ($CF_2$—$CH_A$=$CH_B$, D*T*t, $^3J_{HA\text{-}F}$=4.2 Hz, $^3JH_A\text{-}H_B$=15.8 Hz, 1H);

5.90 ppm ($CH_A$=$CH_B$—$CH_2$—O, D*T*t, $^4J_{HB\text{-}F}$=12 Hz, 1H);

4.15 ppm (=CH—$CH_2O$, complex group of peaks, 2H)

3.55–3.75 ppm ($CH_2OH$), complex group of peaks, 4H);

3.50 ppm (O—$CH_2$—C, singlet 2H);

1.34 ppm ($CH_2$—$CH_3$, quadruplet, 2H);

0.85 ppm (—$CH_2$—$CH_3$, triplet, 3H)

Cis isomer:

6.25 ppm ($CF_2$—$CH_A$=$CH_B$, D*T*t, $^3J_{HA\text{-}F}$=2.5 Hz, $^3J_{HA}\text{-}H_B$=12.5 Hz, 1H);

5.60 ppm ($CH_A$=$CH_B$—$CH_2$—O, D*T*t $^4J_{HB\text{-}F}$=15.5 Hz, 1H);

4.28 ppm (=CH—CH$_2$O, complex group of peaks, 2H);
3.55–3.75 ppm (CH$_2$—OH, complex group of peaks, 4H)
3.44 ppm (O—CH$_2$—C, singlet, 2H);
1.34 ppm (—CH$_2$—CH$_3$, quadruplet, 2H);
0.85 ppm (—CH$_2$—CH$_3$, triplet, 3H)

EXAMPLE 3 a) 273 grams of perfluoroalkyl iodide C$_8$F$_{17}$—I (1.5 mole) previously washed at ambient temperature with an aqueous bisulfite solution to eliminate traces of iodine-containing impurities, 93 grams of trimethylolpropane monoallylether (0.53 mole) and 120 grams of demineralized water were introduced into a 1 liter reactor heated by a thermostatted double envelope and provided with an anchor blade agitator and a reflux coolant. The heterogeneous mixture was inerted with nitrogen then heated with vigorous stirring at 70° C. 0.4 grams of AIBN initiator was then added. The reaction was exothermic and the double envelope was cooled for several minutes so as not to exceed 90° C. The temperature was kept at 75° C. and the reactant conversion was monitored by gas chromatography. 0.2 grams of AIBN was added every two hours. C$_8$F$_{17}$—I conversion was complete after 6 hours. The excess starting diol was eliminated by washing the organic phase three times with water at 75° C. Analyzing the latter confirmed the presence of the expected addition product as the major compound. This intermediate rapidly solidified (72° C.).

b) In the same reactor, the dehydroiodation reaction was commenced, directly on the organic phase. This latter was kept at 70° C. and 60 grams of water was added at 60° C., then a solution containing 20.3 grams of sodium hydroxide (0.5 mole) in 80 grams of water was added dropwise over one hour so as not to exceed 60° C. After 6 hours, GC analysis showed that the reaction was complete. After decanting, the aqueous phase was eliminated by aspiration then the organic phase was washed with demineralized water at 50° C. to neutrality. After separating out the aqueous phase, the fluorinated diol obtained was dried by azeotropic distillation with cyclohexane. The solvent was then distilled off under reduced pressure. A pale yellow viscous liquid was obtained which slowly solidified at ambient temperature (MP=38° C.) with a yield of 95% with respect to the starting C$_8$F$_{17}$—I. It was a mixture containing 0.7 mole % of starting diol, 73.1 mole % of trans isomer and 24.5 mole % of cis isomer.

Carbon-13 NMR analysis (75.5 MHz, CDCl$_3$) produced: the following signals for the trans isomer:
    138.8 ppm (CF$_2$—CH=CH—, $^3J_{C\text{-}F}$=9 Hz);
    117.3 ppm (CF$_2$—CH=CH, $^2J_{C\text{-}F}$=23.7 Hz);
    73.4 ppm (CH$_2$O—CH$_2$—C—);
    69.6 ppm (=CH—CH$_2$—O);
    66.1 ppm (—CH$_2$OH);
    43 ppm (C(CH$_2$OH)$_2$);
    23.0 ppm (CH$_3$—CH$_2$—);
    7.4 ppm (CH$_3$—CH$_2$—);
the following signals for the cis isomer:
    142.3 ppm (CF$_2$—CH=CH—, $^3J_{C\text{-}F}$=5.6 Hz);
    117 ppm (CF$_2$—CH=CH, $^2J_{C\text{-}F}$=23.7 Hz);
    73.8 ppm (CH$_2$O—CH$_2$—C—);
    67.5 ppm (=CH—CH$_2$—O);
    66.0 ppm (—CH$_2$OH);
    42.9 ppm (C(CH$_2$OH)$_2$);
    23.0 ppm (CH$_3$—CH$_2$—);
    7.4 ppm (CH$_3$—CH$_2$—);

EXAMPLE 4

C$_6$F$_{15}$—(CH$_2$)$_3$OCH$_2$—C(CH$_2$OH)$_2$C$_2$H$_5$ 492 grams (1 mole) of the C$_6$F$_{13}$ fluorinated diol described in Example 2 in 370 grams of methanol and 20 grams of 5% palladium on charcoal and 10 grams of K$_2$CO$_3$ were introduced into a stirred reactor with a volume of about 1 liter. Hydrogen was added to a pressure of 20 bars. The reaction was exothermic: the temperature rose to 50° C. while the pressure fell to 5 bars over 10 min. Hydrogen was added again to a pressure of 20 bars until no more hydrogen was absorbed. The reaction was ended at 40° C. at 60 bars. Gas chromatographic analysis showed that all of the unsaturated diol had been transformed. The catalyst was separated by filtering, then the solvent was eliminated under reduced pressure. The structure of the saturated diol obtained in a yield of 97° C. was confirmed by proton NMR (400 MHz, CDCl$_3$):

The following was observed:
    the signals at 6.45 and 6.25 ppm (CF$_2$—CH$_A$=CH$_B$) of the cis/trans isomers disappeared;
    the signals at 5.90 and 5.60 ppm (CH$_A$=CH$_B$—CH$_2$—O) of the cis/trans isomers disappeared;
    3.5 ppm (—CH$_2$—CH$_2$O, triplet);
    3.6–3.7 ppm (CH$_2$OH, complex group of peaks, 4H);
    3.44 ppm (O—CH$_2$—C, singlet, 2H);
    2.15 ppm (CF$_2$—CH$_2$, broad multiplet);
    1.89 ppm (CF$_2$—CH$_2$—CH$_2$—, broad multiplet);
    1.34 ppm (—CH$_2$—CH$_3$, quadruplet, 2H);
    0.85 ppm (—CH$_2$—CH$_3$, triplet, 3H).

EXAMPLE 5

62 grams (0.1 mole) of the C$_6$F$_{13}$ iodine addition product described in Example 2, 13.8 grams (0.11 mole) of finely powdered potassium carbonate, 160 grams of absolute ethanol and 6 grams of 5% palladium catalyst on charcoal were introduced into a stirred autoclave with a capacity of about 0.5 liters. After purging with nitrogen, hydrogen was added to a pressure of 50 bars. It was heated to 60° C. with stirring. The pressure stabilized at about 40 bars after 20 hours. The catalyst and carbonate were separated by filtering, then the solvent was eliminated under reduced pressure. The viscous liquid obtained was re-dissolved in 200 ml of methylene chloride. The organic phase was washed with water to eliminate KI, then dried over sodium sulfate. After filtering then eliminating the solvent, the viscous liquid obtained, which solidified rapidly, contained no more iodine-containing addition product (analysis by gas chromatography). 47 g (i.e., a yield of 95%) of the same product as Example 4 was obtained.

EXAMPLE 6

The procedure of Example 4 was followed, replacing the C$_6$F$_{13}$ diol with the C$_8$F$_{17}$ diol obtained in Example 3. Under identical conditions, the saturated solid fluorinated diol was obtained in a yield of 96%.

EXAMPLE 7

610 g of 2,2,4-trimethyl-hexamethylene diisocyanate and 26.5 g of dibutyl dilaurate tin were introduced into a 5 liter reactor. 715 g of the fluorinated diol of Example 2 was added, and the mixture was allowed to react for 1 hour at 80° C. The temperature was allowed to fall to 40° C., then 2.9 g of ionol, 492.7 g of hexamethylene diacrylate and 343.8 g of 2-hydroxyethylacrylate were added. The reaction was allowed to continue until infrared analysis showed that the isocyanate band at 2260 cm$^{-1}$ had disappeared. 5% by weight of Irgacure 184 photoinitiator was then added.

A fiber was then coated whereby the primary coating was a standard coating and the secondary coating was a coating of the material produced above. Photopolymerization was carried out under UV.

The static fatigue was then measured with two points of flexion. Fibers 2.5 cm in length were washed in precision glass tubes; 20 fibers were placed in each tube. 5 tubes with different diameters were used, imposing the following stresses on the fibers:

1. 456 kpsi (3144 MPa);
2. 419 kpsi (2889 MPa);
3. 399 kpsi (2751 MPa);
4. 386 kpsi (2661 MPa);
5. 353 kpsi (2434 MPa).

The stressed fibers were placed in a climatized chamber at 85° C., with 85% relative humidity. The rupture time for each fiber was automatically recorded via an acoustic detector. The time to rupture was plotted as a function of the applied stress on a logarithmic scale and the static fatigue factor n was calculated from the slope of the straight line obtained. In the case of a standard coating, the value of n was 18–20, while with the fluorinated diol-based composition of the invention, the value of n was 23.

The invention is not limited to the embodiments described; it can, for example, be applied to fiber ribbons. The fluorinated diol can also be used as a mixture with other diols. The diisocyanate can be completely or partially replaced by a polyisocyanate.

What is claimed is:

1. A polyurethane polymeric material for coating optical fibers, based on at least one diol, a diisocyanate and an ethylenically unsaturated compound, characterized in that the diol is a fluorinated diol with formula I:

$$C_nF_{2n+1}-A-CH_2OCH_2-C(CH_2OH)_2-R$$

where n is 2 to 20, and A signifies —CH=CH or —CH$_2$CH$_2$—, and R is an alkyl group containing 1 to 4 carbon atoms.

2. A polymeric material according to claim 1, in which the diol is unsaturated and corresponds to formula:

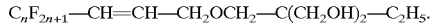

3. A polymeric material according to claim 1, in which the diol is saturated and corresponds to formula:

4. A polymeric material according to claim 1, in which in the diol, R is C$_2$H$_5$.

5. A polymeric material according to claim 1, in which in formula (I), n is a whole number and is in the range 6 to 14 inclusive.

6. A polymeric material according to claim 1, in which in formula (I), $C_nF_{2n+1}$ results from a mixture and n is in the range 6 to 14 inclusive.

7. A polymeric material according to claim 1, in which in formula (I), n is in the range 6 to 8 inclusive.

8. A polymeric material according to claim 1, in which the ethylenically unsaturated compound is an acrylate.

9. A method of preparing a material according to claim 1, comprising:

(i) a step of reacting the fluorinated diol with the diisocyanate to produce a fluorinated diisocyanate prepolymer;

(ii) a step of reacting the fluorinated diisocyanate prepolymer with a hydroxyl-containing ethylenically unsaturated compound.

10. A fiber coated with at least one coating of a material according to claim 1 which has been light-cured.

11. A fiber according to claim 10, in which the material is light-cured in the presence of a diacrylate as a reactive diluent.

12. A fiber according to claim 10, in which the coating is the secondary coating.

13. A fiber drawing method, comprising a step of coating the fiber with a material according to claim 1, optionally as a mixture with a diacrylate as a reactive diluent, and including a step of light-curing.

14. A polymeric material according to claim 1, wherein the polymeric material is free of sulfur.

* * * * *